(12) United States Patent
Sarawat et al.

(10) Patent No.: US 8,887,256 B2
(45) Date of Patent: Nov. 11, 2014

(54) ESTABLISHING VIRTUAL PRIVATE NETWORK SESSION USING ROAMING CREDENTIALS

(75) Inventors: Vikas Sarawat, Broomfield, CO (US); Jennifer Andreoli-Fang, Boulder, CO (US); Stuart Hoggan, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 233 days.

(21) Appl. No.: 13/535,448

(22) Filed: Jun. 28, 2012

(65) Prior Publication Data

US 2013/0312074 A1 Nov. 21, 2013

Related U.S. Application Data

(60) Provisional application No. 61/647,728, filed on May 16, 2012.

(51) Int. Cl.
*G06F 7/04* (2006.01)

(52) U.S. Cl.
USPC .............................................................. 726/7

(58) Field of Classification Search
None
See application file for complete search history.

(56) References Cited

U.S. PATENT DOCUMENTS

| 7,333,799 B2* | 2/2008 | Natarajan ....................... 455/411 |
| 2007/0207804 A1* | 9/2007 | Sharma et al. ................ 455/436 |
| 2010/0191960 A1* | 7/2010 | Beck et al. ..................... 713/156 |

\* cited by examiner

*Primary Examiner* — Brandon Hoffman
(74) *Attorney, Agent, or Firm* — Great Lakes Intellectual Property, PLLC.

(57) ABSTRACT

Providing virtual private network (VPN) sessions or other types of secure or private access to data when a client authorized to access the data travels or otherwise roams from a home network to a partner network is contemplated. The VPN session may be established as part of or as a result of an authentication process undertaken by the client when gaining access to the partner network, such as but not necessarily limited to a home network authentication process undertaken at the partner network to authenticate the client to access partner network services.

20 Claims, 3 Drawing Sheets

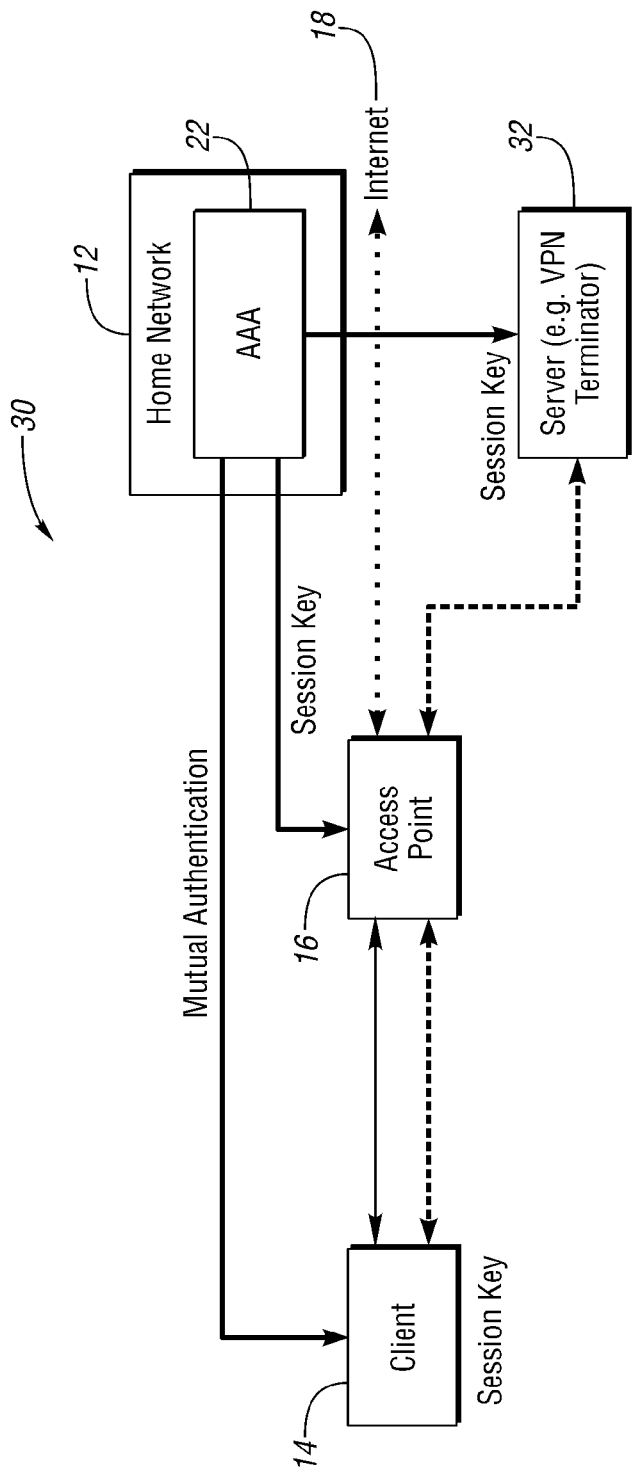
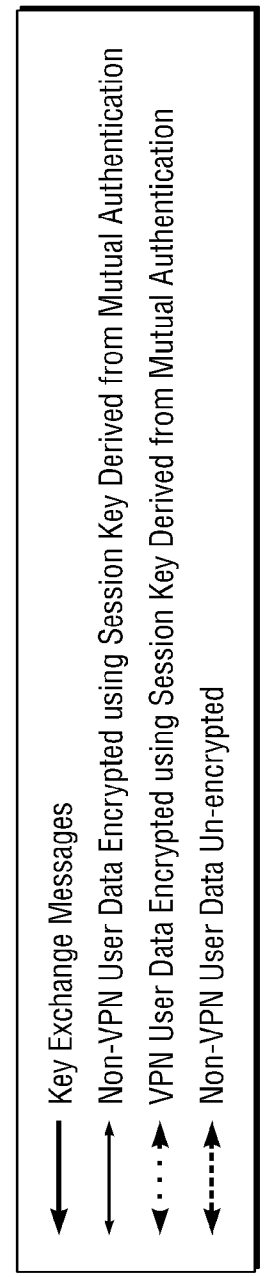
Fig. 3

ESTABLISHING VIRTUAL PRIVATE NETWORK SESSION USING ROAMING CREDENTIALS

CROSS-REFERENCE TO RELATED APPLICATIONS

This application claims the benefit of U.S. provisional Application No. 61/647,728 filed May 16, 2012, the disclosure of which is incorporated in its entirety by reference herein.

TECHNICAL FIELD

The present invention relates to establishing a secure communication channel to permit access to secure information when an accessing client is located off-network, such as but not necessary limited to facilitating a virtual private network (VPN) session when a client desires access to the secure information after roaming from a home network to a partner network.

BACKGROUND

Wi-Fi Roaming Architecture and Interfaces Specification, WR-SP-WIFI-ROAM-102-20216, describes a Wi-Fi technology which enhances the user experience by allowing mobile consumption of rich multimedia content and access to data. The specification describes architecture requirements for data roaming among system operators of Wi-Fi networks. The described roaming allows a subscriber to use their operator subscription to gain connectivity to the Internet using a roaming partner Wi-Fi network. When roaming from the home network to one of the partner networks, a client attempting to gain access to the partner network may be required to input a username and password for verification by the home network prior to the partner network agreeing to allow the client access to its services, e.g., prior to allowing the client unbound access to the Internet or other services.

Once the client is enabled to access the Internet or other suitable services through the partner network, a user may desire to access secure information stored at the home network. The home network may require a secure communication medium, such as but not necessary limited to a virtual private network (VPN), in order to provide client access to the secure information. The user may be required to input a username and password to be authenticated prior to the home network or a server associated with the VPN session allowing access to the secure information. In a Wi-Fi roaming scenario, re-submission of the username and password input as part of the Wi-Fi authentication may be cumbersome and cumulative. Accordingly, a need exists to ameliorate this cumbersome process so that users may access the secure information through the VPN session or other suitable means without having to unnecessarily perform duplicative input of username and password.

BRIEF DESCRIPTION OF THE DRAWINGS

FIG. 3 illustrates a system configured to facilitate a VPN session in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
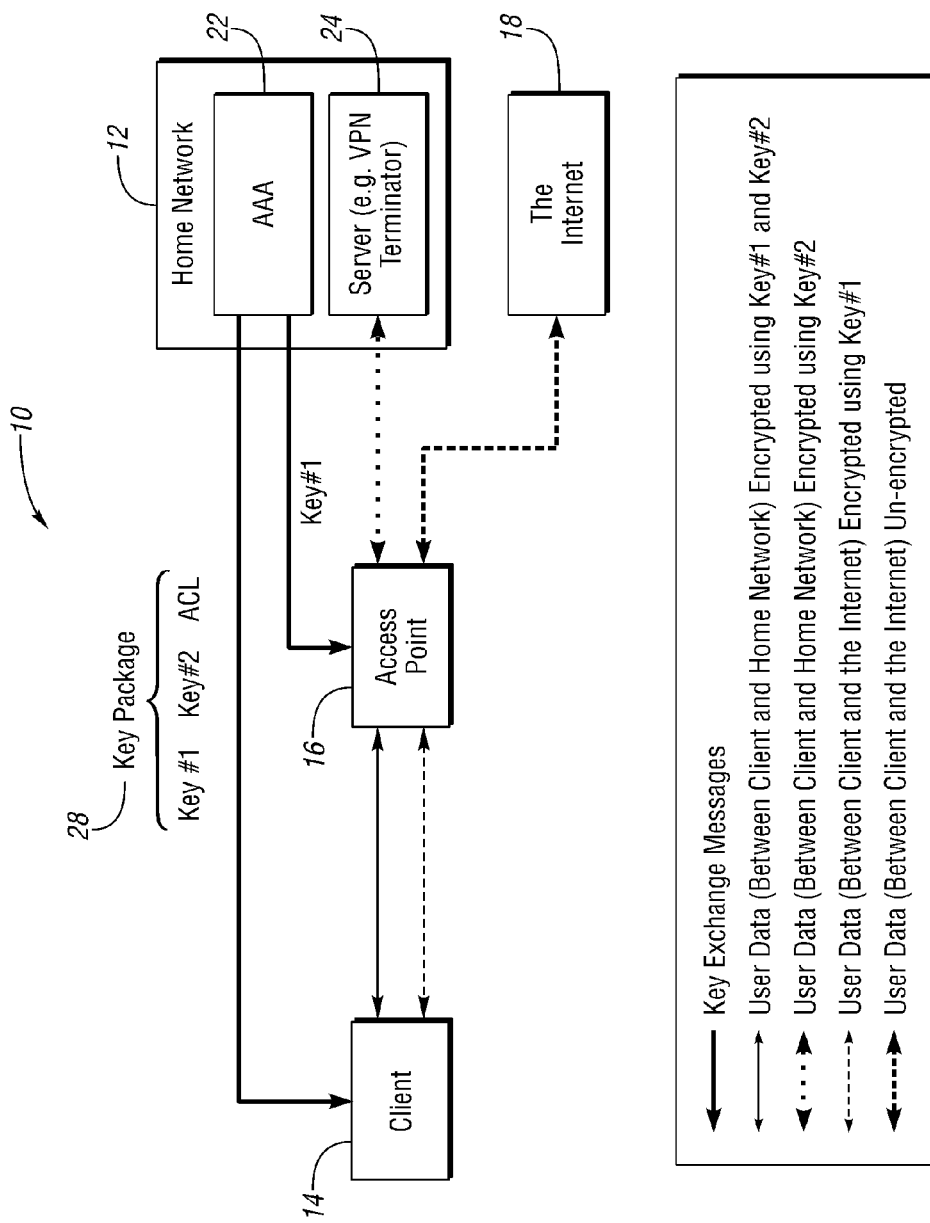
FIG. 1 illustrates a system contemplated by one non-limiting aspect of the present invention to facilitate access to secure information during Wi-Fi roaming.

FIG. 1 illustrates a system 10 contemplated by one non-limiting aspect of the present invention to facilitate access to secure information during Wi-Fi roaming. The system 10 is predominately described with respect to Wi-Fi roaming as it relates to duplicative input operations being required of a user when roaming from a home network 12 to a partner network (not numbered). The present invention, however, is not necessarily limited to Wi-Fi roaming and fully contemplates its use and application in any roaming environment, including other types of radio and cellular roaming. The system 10 illustrates a scenario where a user having a client device 14 roams from their home network to an access point 16 of a partner network through which they desire access to the Internet 18 or other services offered by the partner network. The roaming operation is predominately contemplated to corresponding with that associated with Wi-Fi Roaming Architecture and Interfaces Specification, WR-SP-WIFI-ROAM-102-20216, which relies on the user to input username and password when authenticating the client 14.

The Wi-Fi Roaming Architecture and Interfaces Specification describes, amongst other operations contemplated for use with the present invention, operations, messages, protocols, and the various architectures that may be used to facilitate the client roaming operation. These operations generally relate to the home network 12, or more particularly an Authentication, Authorization and Accounting (AAA) agent 22 associated with the home network 12, providing an access credential to the partner network and/or the access point 16 as an attestation to the authenticity of the client 14. The home network 12 and the partner network may have a relational agreement of the type where the partner network agrees to grant the client 14 access or temporary access to its services according to information included within the access credential. While the access credential may include various types of information and attestation that may be used by the partner network to assess entitlements and other service permission according to the relational agreement or other prior understanding with the home network 12, the present invention is predominately described with respect to arbitrating between bound and unbound access to the Internet 18 according to information included with the access credential.

The unbound access may correspond with the access credential authenticating the client 14. The access point 16 may rely on this assertion to allow the client 14 to undertake communications with any device or web site reachable through the Internet 18, such as if the client 14 were connected to a similar type of access point (not shown) of the home network 12. Optionally, the permissions may be restrained by bandwidth or speed limitations specified within the access credential and the client 14 access being limited to certain web sites or all together prevented from access. The bound access may correspond with the access credential failing to authenticate the client 14. The client 14 may be determined as authenticated or unauthenticated depending on whether the AAA agent is able to verify the veracity of information provide through the client 14 relative to previous information associated therewith, e.g. such as based on whether a username and password input to the client 14 match with a username and password previously associated with the client 14. The information exchanged between the client 14 and the AAA server 22 may be private or desired to be kept from the access point 16 and/or the partner network.

One non-limiting aspect of the present invention contemplates communicating authenticating information between the client 14 and the AAA agent 22 through a private communication medium, such as but not necessarily limited to a tunnel. The tunnel may be secure medium through the access point 16 between the client 14 and AAA server 22 through which the username and password or other private information may be shared without being ascertained by the access point or the partner network. The tunnel may be an Extensible Authentication Protocol-Tunneled Transport Layer Security (EAP-TTLS) or other arrangement where IP traffic is put in another IP header or where one layer traffic is put into the same header. While the Internet 18 is shown separately, the tunnel and other communications between the access point 16 and the home network 12 may be carried completely or partially over the Internet 18 between the access point 16 and/or at the client 14. The use of the tunnel may be beneficial in protecting the secrecy of information exchanged between the client 14 and home network 12, thereby enabling the username and password to be kept from others. The secrecy of such information can be particular beneficial in the event the username and password is a universal password used across platforms or otherwise used to grant or gain access to other services.

The tunnel between the client 14 and AAA agent 22 may be established prior to the access point 16 determining whether to grant the client 14 bound or unbound access to services. This may require the access point 16 to temporarily grant the client 14 limited communication capabilities sufficient to facilitate establishing the tunnel and to perform the other operations necessary to providing the desired authentication by the AAA agent 22. While the access point 16 and/or partner network could be enabled to perform the authentication without deviating from the scope and contemplation of the present invention, it is believed to be particularly beneficial, at least form a security perspective, to have the AAA agent 22 or other entity of the home network 12 conduct the home network authentication. This type of single entity controlled authentication allows the private information used for home network authentication to be more secure since it need not be shared with third parties i.e., the partner network. Privacy concerns and other sharing limitations may also restrain the capabilities of the home network 12 to share the username and password or other personally identifying information with the partner network.

Optionally, the relational agreement between the home network 12 and partner network may include a prearranged understanding with respect to securing communications between the client 14 and access point 16 prior to the AAA agent 22 performing the home network authentication. This may include some method of encrypting communication between the client 14 and access point 16 according to a predefined set of keys. This predefined understanding may provide the access point 16 with some assurance that the client 14 was previously authorized by the home network 12 to connect to it, i.e., it may be presumed that the client 14 is unauthorized if it is not ready in possession of the predefined key. The relational agreement may also specify the parameters regarding the services available to the client 14 through the access point 16 prior to its home network authentication. These temporary authorizations may vary according to implementation. They may include, for example, forcing a web browser of the client 14 to a particular website or private interface of the access point 16 or the home network 12 through which inputs may be received to facilitate the home network authentication process. One authorization may include providing a user-interface through which user inputs can be received.

Once the client 14 is able to establish a level of communication with the access point 16 sufficient to facilitate establishing the tunnel with the AAA agent 22, the home network authentication process may begin. As noted above, one non-limiting aspect of the present invention contemplates the home network authentication being based on matching contemporaneously input username and password with a username and password previously associated with the client 14. The home network authentication may also include additional factors to further test the identity of the client 14, such as but not necessary limited to assessing a MAC address, an IP address, and e-mail address, or a pre-loaded credential of the client 14 relative to corresponding information previously associated therewith. One object of the home network authentication processes to identify the client 14 as one of their subscribers and, based thereon, to provide a corresponding credential or assertion to the access point 16 or partner network so that the access point 16 can make its own assessment as to whether or not it should provide services to the client 14, particularly services related to a previous agreement between the home network 12 and the partner network.

FIG. 1 illustrates the exemplary services provided through the access point 16 relating to establishing a VPN session with a server or VPN terminator 24 associated with the home network 12, such as to facilitate access to private or confidential information of the home network 12. The VPN related information may correspond with recordings of the client, particular services of the home network, or other types of information which may not be generally available to the partner network. The VPN session may be established to simulate the client 14 being connected to the home network 12 in a manner that would approximate their normal access to the secured information. The ability to simulate an actual connection to the home network 12 when the client 14 has roamed to the partner network may be beneficial in facilitating customer satisfaction and continuity of services. Prior to allowing the client 14 access to the secure information using the VPN session, the server 24 may require further authorization of the client 14. This authorization may include the server 24 requesting the client 14 to resubmit their username and password. Authorization may be granted in the event the username and password match with the previously associate using a password and denied in the event the username and password fail to match.

One non-limiting aspect of the present invention contemplates ameliorating the burdens on the user when attempting to establish the VPN session after surpassing the home network authentication process. One manner in which the burdens on the user can be ameliorated in accordance with the present invention is to allow establishment of the VPN session, i.e., server authentication of the client, without requiring resubmission of the username and password input as part of the home network authentication process. This may include, for example, requiring the client 14 to input additional information other than the username and password that the server 24 can used to perform the desired authentication. Another option may include the client 14 automatically providing a credential received this part of the home network authentication process to the server as a form of self-authentication. This credential may be one or more keys included as part of a key package 28 provided to the client 14 upon successful completion of a home network authentication process.

The key package 28 is shown to include a first key, a second key, and an access control list (ACL). The key package 28 may be provided from the AAA agent 22 to the client 14 to facilitate securing communications through the access point 16. The first key may also be provided from the AAA agent 22 to the access point 16 to facilitate securing communications between the client 14 and access point 16. The communications secured with the first key may relate to non-VPN session related communications, such as those associated with unbound access to the Internet 18. FIG. 1 illustrates use of the first key to encrypt communications only between the client 14 and access point 16 and not with further communications to the Internet 18 as it may be beneficial from a security standpoint to limit the number of entities in possession of the first key. The present invention, however, fully contemplates use of the first key or other keys to facilitate securing non-VPN-based communications beyond the access point 16. In the absence of this additional security, the communications taking place between the access point 16 and the Internet 18 are shown to occur in an un-encrypted state.

The VPN based communications associated with establishing the VPN session between the client 14 and the server 24 are shown to be encrypted using both of the first key and the second key. This may include additionally encrypting information desired for transmission between the client 14 and the server 24 within a VPN tunnel or other medium through the access point 16. The VPN tunnel may be isolated from the access point 16 such that the access point 16 is unable to ascertain the information transmitted therethrough. Communications between the client 14 and access point 16 needed to facilitate establishing the VPN session may be encrypted with the first key in order to ensure their security. In this manner, some or all of the information associated with the VPN session may be encrypted with both of the first key and the second key. This double-encryption process may require a partial decryption by the access point 16 using the first key in order to recover information needed to facilitate establishment of the VPN session while at the same time allowing some of the VPN session related information to remain encrypted according to the second key in order to prevent the access point 16 from ascertaining its contents.

The key package 28 used to facilitate delivery of the first key and the second key is shown to include the ACL. The ACL may specify a list of permissions to be used by the client in assessing when to use one or both of the first key and the second key. The ACL may also specify an IP address or provide other identification for use in identifying whether one or both of the first and second keys are to be used to encrypt the corresponding signaling/messaging. The ACL may specify various security related parameters according to the type of message being communicated and/or the purpose of the message being communicated such that it can be cross-referenced to identify whether a corresponding communication should be secured with the first key and/or the second key. The ACL, like the first and second key, may be provided by the AAA agent 22 in order to facilitate enhancing the security of the system 10. It is believed that the security of the system 10 can be enhanced with the AAA agent 22, which is also tasked with assessing identity of the client 14, being a single source for assigning the keys associated with encrypting communications between not only the client 14 and access point 16 set between the access point 16 in the server 24 and/or the Internet 18. This single source of key encryption and permissions is believed to be beneficial as it may help ameliorate the number of opportunities at which the keys can be stolen or otherwise misused.

Figure 2:
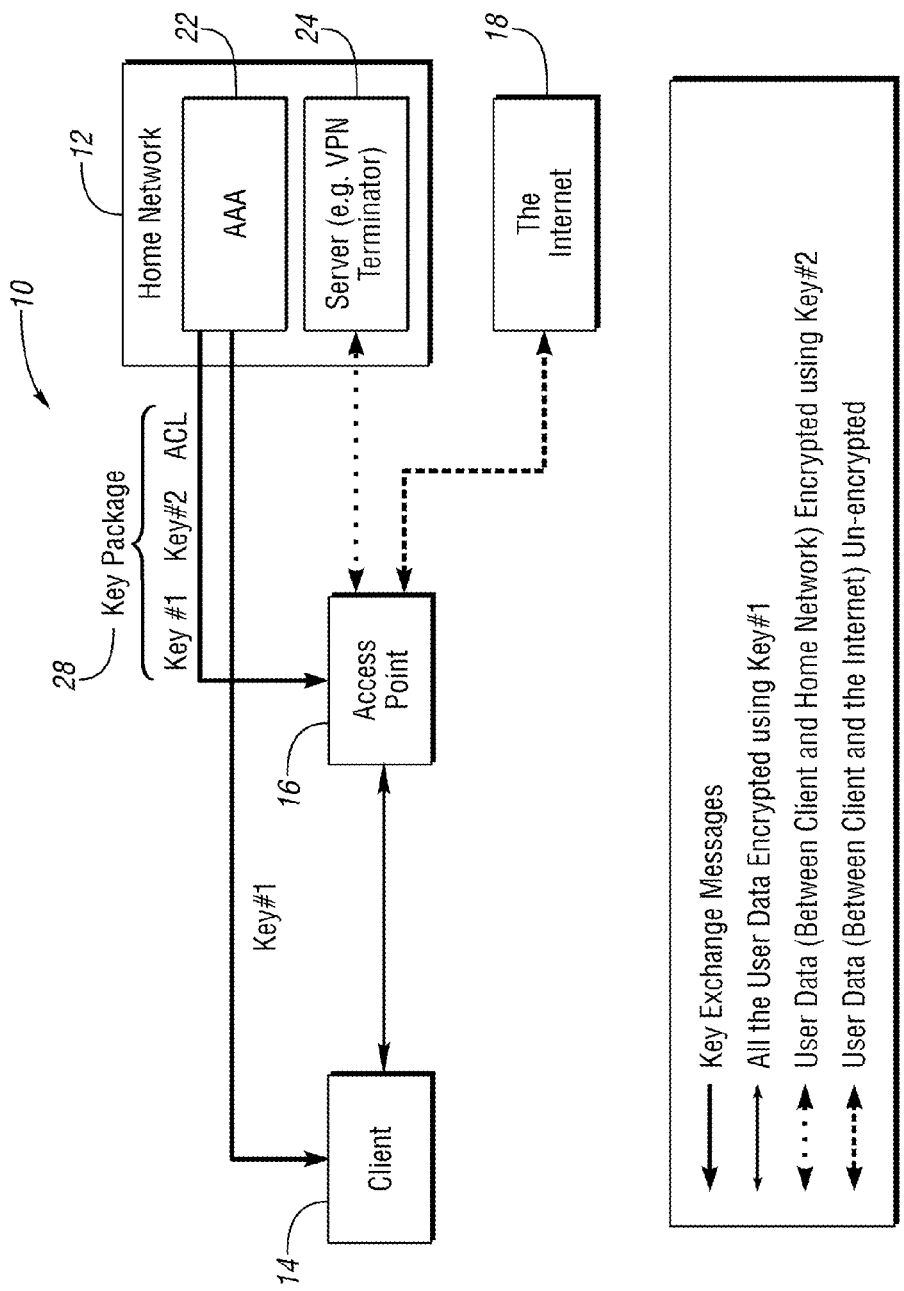
FIG. 2 illustrates a key package being provided to the access point instead of the client in accordance with one non-limiting aspect of the present invention.

FIG. 2 illustrates the key package 28 being provided to the access point 16 instead of the client 14 in accordance with one non-limiting aspect of the present invention. In this configuration, only the first key is provided to the client 14 by the AAA agent 22. The client 14 may use this first key to secure communications regardless of the content being transmitted. The access point 16 may be provided with the ACL and tasked with assessing whether the second key is needed to secure certain communications, e.g., those associated with the VPN session. The reliance on the access point 16 to process the ACL and otherwise control use of the first and second keys, or other keys that may be used within the system, may be beneficial in ameliorating the processing demands on the client 14 and/or to eliminate the need for the client 14 to load or otherwise be configured with specific applications in order to facilitate selectable use of the first and second keys. It may also be beneficial to limit exposure of the second key and/or the decision-making associated with the use of the second key to the access point 16 on the assumption that the access point 16 is more secure or more unlikely to be compromised then the client 14.

FIG. 3 illustrates a system 30 configured to facilitate a VPN session in accordance with one non-limiting aspect of the present invention. The system 30 is generally similar to the systems described above except for having a VPN server 32 illustrated as a standalone component independent of the home network 12 and a different delivery mechanism for transmitting the keys to the client 14 and the access point 16. As part of the home network authentication process, a mutual authentication takes place between the client 14 and the AAA agent 22, such as through a secure tunnel supported by the access point 16 or through another type of communication medium between the client 14 and the AAA agent 22. The mutual authentication process may correspond with an Extensible Authentication Protocol-Tunneled Transport Layer Security (EAP-TTLS) process. As part of this process, the client 14 and/or AAA agent 22 may exchange information associated authenticating the client 14, e.g., the username and password noted above or other identifying information.

The client 14 may be configured to derive a session key from information exchange as part of the mutual authentication process. The AAA client 22 may provide the same session key to the access point 16 so that informational exchanges between the client 14 and the access point 16 can be secured using the session key. The client 14 may also use the session key to facilitate a VPN session with the server 32. The VPN session may be tunneled through the access point 16 or otherwise supported with communications therethrough. The session key may be used to secure both VPN and non-VPN session communications between the client 14 and access point 16 and/or the access point 16 and the server 32. The use of the single session key may be beneficial over the above embodiments where the first and second keys were used as it may reduce the number keys used to secure communications. The AAA agent 22 may be tasked with tracking, renewing, and otherwise managing use of keys within the system 30, so that it can become a more of a burden to support those operations when multiple keys are used, e.g., when the first and second keys are used.

As supported above, one non-limiting aspect of the present invention describes establishing secured VPN tunnels using credentials provided by a subscriber for Wi-Fi roaming authentication. The system can be particularly beneficial as operators deploy Wi-Fi roaming services, as such operators may be looking for ways to provide value added services to their subscribers, subscribers of roaming partners, subscriber of enterprise customers etc.

One non-limiting aspect of the present invention relates to ameliorating processing demands to support enterprise operations. This may include allowing enterprise customers to use their enterprise credentials (e.g. enterprise email and password) for Wi-Fi authentication. The operator verifies these credential (in real time) with the enterprise using protocols (e.g. EAP-TTLS). As part of this service, the enterprise customers can roam anywhere in the operator's Wi-Fi service footprint and get access to Wi-Fi services using their enterprise email and password. The username and password are tunneled straight to the enterprise. The enterprise, upon verifying the credentials, informs the operator whether the subscriber should be allowed access or not, and thereafter, to provide VPN sessions without having to resubmit the username and password.

One non-limiting aspect the present invention relates to, after a residential customer has successfully authenticated for the Wi-Fi services, allowing them to remotely access a network at his/her home (e.g., smart home, slingbox) without having to resubmit username and password or other identifying information are input as part of the Wi-Fi authentication process. Additionally, after the residential customer has successfully authenticated for the Wi-Fi services, he/she may be also be interested in remotely consuming content (e.g, watching HBO movies on HBO site), which may also be facilitated without having to resubmit username and password.

One non-limiting aspect of the present invention relates to a home network providing a client with two keys: Key #1 to encrypt traffic between the client and the Wi-Fi AP; and Key #2 to encrypt traffic between the client and the remote server (i.e., enterprise, residential customer's network at home, content provider, or CDN server). This may require the subscriber to enter their username and password just once to get access to Wi-Fi services and establish secured session with the enterprise. The enterprise can also share an ACL at the time of authentication message (EAP-TTLS) exchange with the subscriber device, which subscriber device can use to determine what traffic should be encrypted (using key#2) vs. not. This option may be preferable with IPv6 as IPv6 natively supports IPSec, meaning the IPSec is implemented as part of the IPv6 stack and no separate IPSec software is required.

One non-limiting aspect of the present invention relates to the home network providing the visited network with two keys: Key#1) to encrypt traffic between the client and the Wi-Fi AP key#2) to encrypt traffic between the Wi-Fi AP (or some other device in the visited network) and the remote server (i.e., enterprise, residential customer's network at home, content provider, or CDN server). The home network also provides an ACL to the visited network, which visited network uses to decide what traffic from the subscriber needs to be encrypted using the Key#2. This method could transparently work for both IPv4 and IPv6.

One non-limiting aspect of the present invention relates to the home network using EAP-TTLS Master Session Key (MSK) as a pre-shared secret for authenticating (mutual) the VPN session between the client and the remote VPN server (i.e., enterprise, residential customer's network at home, content provider, or CDN server). After the subscriber has performed Wi-Fi authentication using a username/password with EAP-TTLS an MSK is created for encrypting the traffic between the client and Wi-Fi AP. The home network sends the MSK to the remote VPN server. When the subscriber initiates a VPN session between the client and remote server, the MSK is then used for mutual authentication without having to create a second key or ask the subscriber for their username/password.

One non-limiting aspect of the present shown in FIG. 1 relates to a home network giving Key#1, Key#2 and the ACL to the client where ACL provides the logic on when should the client encrypt the traffic using both Key#1 and Key#2 or only Key#1. The ACL can be used to identify the IP address of a server (VPN) in the home network which essentially tells the client to encrypt all traffic sent to this IP address with Key#2 first and then Key#1 and all other traffic should be encrypted with Key#1 only.

One non-limiting aspect of the present shown in FIG. 2 relates to a home network confirming subscriber authentication to the Wi-Fi visited network and giving the visited network Key#1 for traffic encryption and decryption on the Wi-Fi link. Home Network also gives a Key#2 and an ACL to the Wi-Fi visited network where ACL provides the logic on when the visited Wi-Fi network should encrypt the traffic using Key#2 before forwarding it upstream (away from the client). The ACL may be used to identify an IP address of a server in the home network which essentially tells the Wi-Fi visited network to encrypt all traffic sent by the client to this IP address with Key#2. Additionally, the Wi-Fi visited network may also decrypt all the traffic received from this IP address using Key#2 before forwarding to the client. All other traffic from the client is not encrypted by the Wi-Fi visited network before it is sent upstream.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating a virtual private network (VPN) session over the Internet between a client and a server associated with a home network after the client roams to an access point of a partner network, the method comprising:

establishing a secure tunnel through the access point between the client and the home network to facilitate home network authentication of the client, the home network authentication including the client communicating a username and password through the secure tunnel, the secure tunnel carrying the username and password through the access point without exposure of the username and password to the partner network; and if the home network authorizes the username and password, provisioning at least one of the client and the access point with at least a first encryption key, the first encryption key being used to secure the VPN session at least between the access point and the server, the server relying on the first key to authenticate the client for access to the secure information such that communication of the username and password is not needed.

2. The method of claim 1 further comprising the server authenticating the client for access to the secure information without the username and password being communicated to the server.

3. The method of claim 1 further comprising the server authenticating the client for access to the secure information without the username and password being further communicated from the client after being communicated through the tunnel as part of the home network authentication.

4. The method of claim 1 further comprising provisioning the client with the first key and a second key and the access point with the second key and not the first key, securing a first portion of the VPN session occurring between the client and the access point with both of the first key and the second key and securing a second portion of the VPN session occurring between the access point and the sever with the first key and without the second key.

5. The method of claim 4 further comprising preventing use of the first key to secure other sessions through the access point between the client and other servers on the Internet, securing at least a portion of the other sessions occurring between the client and the access point with the second key.

6. The method of claim 1 further comprising provisioning the access point with the first key and a second key and the client with the second key and not the first key, securing a first portion of the VPN session occurring between the client and the access point with the second key and without the first key and securing a second portion of the VPN session occurring between the access point and the sever with the first key and without the second key.

7. The method of claim 6 further comprising preventing use of the first key to secure other sessions through the access point between the client and other servers on the Internet, securing at least a portion of the other sessions occurring between the client and the access point with the second key.

8. The method of claim 1 further comprising provisioning the client with the first key through a derivation operation where the client derives the first key from information exchanged during a mutual authentication operation carried out through the tunnel as part of the home network authentication, provisioning the access point with the first key with direct transmission of the first key, securing a first portion of the VPN session occurring between the client and the access point with the first key and securing a second portion of the VPN session occurring between the access point and the sever with the first key.

9. The method of claim 8 further comprising preventing use of the first key to secure other sessions through the access point between the client and other servers on the Internet, securing at least a portion of the other sessions occurring between the client and the access point with the first key.

10. The method of claim 1 further comprising preventing the client from accessing the Internet through the access point until the home network authentication authenticates the username and password communicated through the tunnel.

11. A method of facilitating a virtual private network (VPN) session over the Internet between a client and a server associated with a home network after the client roams to an access point of a partner network, the method comprising:
  preventing the client from unbound access to the Internet through the access point prior to completing a home network authentication;
  providing a secure tunnel through the access point between the client and the home network to facilitate the home network authentication of the client, the client passing the home network authentication if a username and password communicated from the client through the secure tunnel is authenticated by a authentication agent of the home network;
  if the client passes the home network authentication:
  i) allowing the client unbound access to the Internet through the access point, the unbound access allowing web browsing to any web site; and ii) securing the VPN session at least between the access point and the server with a first key provided from the authentication agent, the server relying on the first key to authenticate the client for access to the secure information without contemporaneous reliance on re-communication of the username and password from the client.

12. The method of claim 11 further comprising, if the client fails the home network authentication, allowing the client bound access to the Internet through the access point, the bound access restricting web browsing to a selected one or more web sites.

13. The method of claim 11 further comprising the client being provisioned with the first key and a second key and the access point with the second key and not the first key, a first portion of the VPN session occurring between the client and the access point being secured with both of the first key and the second key, securing a second portion of the VPN session occurring between the access point and the sever with the first key and without the second key.

14. The method of claim 11 further comprising the access point being provisioned with the first key and a second key and the client with the second key and not the first key, a first portion of the VPN session occurring between the client and the access point being secured with the second key and without the first key, securing a second portion of the VPN session occurring between the access point and the sever with the first key without providing the first key to the client.

15. The method of claim 11 further comprising the client deriving the first key from information exchanged during a mutual authentication operation carried out through the tunnel as part of the home network authentication, the access point being provisioned with the first key through direct transmission of the first key, a first portion of the VPN session occurring between the client and the access point being secured with the first key, securing a second portion of the VPN session occurring between the access point and the sever with the first key.

16. A method of facilitating a virtual private network (VPN) session over the Internet between a client and a server associated with a home network after the client roams to an access point of a partner network, the method comprising:
  performing home network authentication through private communication between the client and an authentication agent of the home network where at least a portion of the private communication is provided through the access point, the home network authentication determining whether an input username and password from the client matches with an authenticated username and password previously associated with the client, the private communication preventing the access point and the partner network from ascertaining the input username and password;
  if the input username and password match the authenticated username and password:
  i) instructing the access point of the client being authenticated, the access point then allowing the client unbound access to the Internet;
  ii) instructing the client and the access point to secure non-VPN sessions, at least between the client and the access point, with a first key, the first key being provided to both of the client and the access point;
  iii) instructing the client to secure the VPN session with a second key, the second key being provided to the client and the server;
  iv) instructing the server to authenticate establishment of the VPN session based on the second key and without additional input of username and password; and if the input username and password fail to match the authenticate username and password, instructing the access point that the client is unauthenticated, the access point then providing the client bound access to the Internet.

17. The method of claim 16 further comprising establishing a tunnel through the access point between the client and the authentication agent to perform the home network authentication, the tunnel providing private communication between the client and the authentication agent.

18. The method of claim 16 further comprising instructing the client to provide a user interface to facilitate selection of the authentication agent, the authentication agent being selected based on authentication agent selection criteria input by a user to the client.

19. The method of claim 16 further comprising instructing the access point to select the authentication agent from a plurality of available authentication agents based on authentication agent selection criteria wirelessly transmitted from the client to the access point, the authentication agent selection criteria being selected without being input by a user of the client.

20. The method of claim 16 wherein the second key is not provided to the access point.

* * * * *